United States Patent
Kandhasamy et al.

(10) Patent No.: US 11,649,362 B2
(45) Date of Patent: May 16, 2023

(54) CONDUCTIVE POLYMER COATING COMPOSITION AND METHOD OF MAKING THE SAME

(71) Applicant: The Boeing Company, Chicago, IL (US)

(72) Inventors: Kamaraj Kandhasamy, Karnataka (IN); Om Prakash, Karnataka (IN); Patrick J. Kinlen, Fenton, MO (US); Stephen P. Gaydos, St. Louis, MO (US)

(73) Assignee: THE BOEING COMPANY, Arlington, VA (US)

(*) Notice: Subject to any disclaimer, the term of this patent is extended or adjusted under 35 U.S.C. 154(b) by 0 days.

(21) Appl. No.: 17/376,618

(22) Filed: Jul. 15, 2021

(65) Prior Publication Data
US 2023/0019695 A1    Jan. 19, 2023

(51) Int. Cl.
| | |
|---|---|
| *C09D 5/24* | (2006.01) |
| *C09D 7/40* | (2018.01) |
| *H01B 1/12* | (2006.01) |
| *C09D 7/20* | (2018.01) |
| *C09D 7/65* | (2018.01) |

(52) U.S. Cl.
CPC ............... *C09D 5/24* (2013.01); *C09D 7/20* (2018.01); *C09D 7/65* (2018.01); *C09D 7/70* (2018.01); *H01B 1/124* (2013.01)

(58) Field of Classification Search
CPC ... C09D 5/24; C09D 7/20; C09D 7/65; C09D 7/70; H01B 1/124
See application file for complete search history.

(56) References Cited

U.S. PATENT DOCUMENTS

| | | | |
|---|---|---|---|
| 5,416,156 A | 5/1995 | Kamen | |
| 5,423,956 A | 6/1995 | White et al. | |
| 5,911,930 A * | 6/1999 | Kinlen | D01F 6/94 264/178 F |
| 5,972,499 A | 10/1999 | Rodriguez et al. | |
| 6,083,562 A * | 7/2000 | Rodriguez | D01F 6/80 427/393.1 |

(Continued)

FOREIGN PATENT DOCUMENTS

CN    101200510 A    6/2008

OTHER PUBLICATIONS

Abdali et al., "Preparation of Electrospun Nanocomposite Nanofibers of Polyaniline/Poly(methyl methacrylate) with Amino-Functionalized Graphene," Polymers, 2017, 9, 453 (12 pages).

(Continued)

*Primary Examiner* — Mark Kopec
*Assistant Examiner* — Jaison P Thomas
(74) *Attorney, Agent, or Firm* — MH2 Technology Law Group LLP (57) ABSTRACT

A conductive polymer coating composition including a conductive fibrillated structure and a base polymer, wherein the conductive fibrillated structure includes a fibrillated polymer and a conductive polymer grafted on the fibrillated polymer, and wherein the conductive polymer coating composition has an electrical conductivity from about $10^{-5}$ S/cm to about $10^{+1}$ S/cm and a thermal conductivity from about 1.1 W/m K to about 3 W/m K.

20 Claims, 6 Drawing Sheets

(56) References Cited

U.S. PATENT DOCUMENTS

| | | | |
|---|---|---|---|
| 6,228,492 B1* | 5/2001 | Kinlen | D06M 15/3562 428/373 |
| 2007/0131362 A1* | 6/2007 | Buchert | D21H 21/40 162/70 |
| 2007/0143932 A1* | 6/2007 | Buchert | H01B 1/124 162/157.6 |
| 2013/0122533 A1* | 5/2013 | Pitchai-Mydeen | H01M 4/624 422/69 |
| 2019/0390037 A1 | 12/2019 | Kinlen | |
| 2020/0363273 A1* | 11/2020 | Hsieh | C08B 15/00 |

OTHER PUBLICATIONS

Cheng et al., Polyaniline-Coated Electro-Etched Carbon Fiber Cloth Electrodes for Supercapacitors, The Journal of Physical Chemistry, 2011, 115, 23584-23590.

Li et al., "Highly Conductive Microfiber of Graphene Oxide Templated Carbonization of Nanofibrillated Cellulose," Advanced Functional Materials, 2014, 24, 7366-7372.

Marsden et al., "Electrical Percolation in Graphene-Polymer Composites," 2018, 2D Materials, 5, 32003 (20 pages).

Wang et al., "Polyaniline coated carbon nanotube/graphene "sandwich" hybrid and its high-k epoxy composites with low dielectric loss and percolation threshold," Applied Surface Science, 2015, 359, 754-765.

Extended European Search Report dated Nov. 24, 2022 in corresponding European Patent Application No. 22177672.7, 7 pages.

* cited by examiner

FIG. 6

CONDUCTIVE POLYMER COATING COMPOSITION AND METHOD OF MAKING THE SAME

TECHNICAL FIELD

The present disclosure generally relates to polymeric coating compositions, and in particular, to conductive polymer coating compositions and methods of making the same.

BACKGROUND

Polymer coating compositions are used in a variety of industries to provide added functionality to coated substrates. These added functionalities can include weather protection, corrosion inhibition, aesthetic designs and coloring, impact resistance, etc. In the aerospace industry, for example, polymer coating compositions can be used on both composite and metal substrates to provide enhanced thermal and electrical conductivity, in addition to the usual requirements relating to corrosion protection, weathering, aesthetics etc. For example, polymer coatings can be used on aircraft surfaces that accumulate electrostatic charges. A conductive coating prevents accumulation of this type of charge and shield electronics from strong electric fields.

Functionality in polymer coating compositions is generally obtained through the incorporating of particulate matter into the polymer coating compositions. For example, metal particles and pigments can be added to a polymer coating composition to increase a conductivity of the polymer coating composition and to create a continuous pathway for thermal and electrical conduction. However, one major drawback of such systems is the loss of functional performance in response to segregation of the particulate matter during various stages of a coating process, such as formulation, application, or curing. In addition, functionality may be loss during service due to environmental stresses, such as, temperature, pressure, and humidity. That is, the functional performance of the polymer coating composition is affected by the degree by which particulate matter within the polymer coating composition settles or segregates during a production or coating process. For example, segregation of conductive particulate matter in a polymer coating composition may lead to a breakdown of the percolation effect and loss in conductivity.

Accordingly, there is a need for polymer coating composition incorporating functional additives that can resist settling or segregating during a production or coating process and/or maintain a percolation threshold to maintain electrical and/or thermal conductivity.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities exemplified in the present disclosure may be achieved by providing a conductive polymer coating composition including a conductive fibrillated structure; and a base polymer, wherein the conductive fibrillated structure includes a fibrillated polymer and a conductive polymer grafted on the fibrillated polymer, and wherein the conductive polymer coating composition has an electrical conductivity from about $10^{-5}$ S/cm to about $10^{+1}$ S/cm and a thermal conductivity from about 1.1 W/m K to about 3 W/m K.

The composition can include from about 1 weight % to about 25 weight % conductive fibrillated structure; from about 20 weight % to about 90 weight % base polymer; from about 0.5 weight % to about 20 weight % fibrillated polymer; and from about 0.1 weight % to about 15 weight % conductive polymer, wherein the base polymer includes one or more of epoxy, acrylic, polyurethane, polysiloxane, polycarbonate, polysilazane, styrene-butadiene rubbers, styrenic block copolymers, acetonitrile butadiene styrene, polyamides, polyetherketone, polyethyleneterephthalate, derivatives thereof, or combinations thereof.

The fibrillated polymer can include one or more of polytetrafluoroethylene (PTFE), a sulfonated tetrafluoroethylene-based fluoropolymer-copolymer, such as Nafion, Nylon, cellulose, high-density polyethylene (HDPE), or combinations thereof.

The conductive polymer can include one or more of polyaniline, polypyrrole, poly(N-methylpyrrole), poly(N-ethylpyrrole), poly(N-propylpyrrole), poly(N-butylpyrrole), poly(3,4-ethylenedioxythiophene), poly (p-phenylene vinylene), 3,4-propylenedioxypyrrole, poly(p-phenylene vinylene), 3,4-propylenedioxypyrrole, 3,4-propylenedioxythiophene, polyfuran, derivatives and copolymers thereof, or combinations thereof.

The conductive polymer coating composition can further include from about 0.1 weight % to about 10 weight % of one or more conductive additives, and wherein the one or more conductive additives can include carbonaceous materials, conductive pigments, metal particles, polyaniline, polypyrrole poly(3,4-ethylenedioxythiophene), aluminosilicate, boron nitride, aluminum nitride, nitrides, carbides, polybenzoxazine or combinations thereof.

The conductive fibrillated structure can further include from about 0.1 weight % to about 10 weight % of the one or more conductive additives.

The conductive polymer is a composite conductive polymer can include one or more conductive additives.

The composition can further include from about 15 weight % to about 40 weight % solvent, and wherein the solvent can include one or more of hexane, acetone, N-methyl-2-pyrrolidone, xylene, water, methyl ethyl ketone, dimethylacetamide, cymene, toluene, cyclohexane, alpha-beta-pinene, hexafluroisopropanol, dimethylformamide, dimethylsulfoxide or combinations thereof.

The solvent can consist essentially of water.

The conductive fibrillated structure can form a reinforcement phase through the base polymer.

The conductive polymer coating composition can have a hardness of H or above when tested under Pencil Hardness ASTM D3363.

The conductive polymer coating composition can have a pull-off adhesion from about 12 to about 20 MPa when tested under ASTM D4541.

The conductive polymer coating composition can have a toughness impact resistance of at least 7 Joules when tested under ASTM D2794.

The conductive polymer coating composition can have a corrosion resistance of at least 3000 hours salt spray when tested under ASTM B117.

The foregoing and/or other aspects and utilities exemplified in the present disclosure may also be achieved by providing a conductive article, including a conductive polymer coating composition as described above, wherein the conductive polymer coating composition provides a continuous conductive network where applied.

The conductive polymer coating composition can have an optical transparency from about 65% to about 95%.

The foregoing and/or other aspects and utilities exemplified in the present disclosure may also be achieved by providing a method of making a conductive polymer coating composition, including creating a conductive fibrillated structure; creating a base polymer composition; and mixing the base polymer with the conductive fibrillated structure.

Creating a conductive fibrillated structure can include fibrillating a fibrillatable polymer; creating a conductive polymer; and grafting the conductive polymer on the fibrillated polymer.

Fibrillating a fibrillatable polymer can include one or more of solvent crazing the fibrillatable polymer, shear deformation the fibrillatable polymer, electro-spinning the fibrillatable polymer, biaxial stretching the fibrillatable polymer, wet, dry and melt spinning the fibrillatable polymer, or combinations thereof.

Grafting the conductive polymer on the fibrillated polymer can include one or more of in-situ polymerization of the conductive polymer to the fibrillated polymer, fibril surface functionalization of the fibrillated polymer with the conductive polymer, fibril-surface modification of the fibrillated polymer with the conductive polymer, or combinations thereof.

The foregoing and/or other aspects and utilities implemented in the present disclosure may be achieved by providing a conductive polymer coating composition substantially as hereinbefore described, with reference to the examples and excluding, if any, comparative examples.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described unless the context clearly dictates otherwise. In the specification, the recitation of "at least one of A, B, and C," includes implementations containing A, B, or C, multiple examples of A, B, or C, or combinations of A/B, A/C, B/C, A/B/B/ B/B/C, A/B/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−5% of a stated target value, maximum, or minimum value.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or can be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

While not bound to any particular theory, percolation theory generally describes a percolation threshold for mixtures, such as mixtures of conductive particles in dielectric materials. Above the percolation threshold, long-range connectivity or conductivity may exist. Whereas, below the percolation threshold, long-range connectivity cannot. From a material and process perspective, the percolation threshold may depend upon multiple factors, such as, particle shapes, size, density, distribution, surface functionalization, interfacial energy, stability of suspension, and the nature of forces exerted during various process steps. In polymer coating compositions including functional particulates, the segregation, settling, or separation of the particulate matter affects its ability to reach the percolation threshold and/or establish a continuous network for conductivity.

The inventors have surprisingly developed a conductive polymer coating composition, including a novel material architecture, and a method of making the same providing a continuous conductive network which resists the segregation, settling, or separation of its conductive components.

Figure 1:
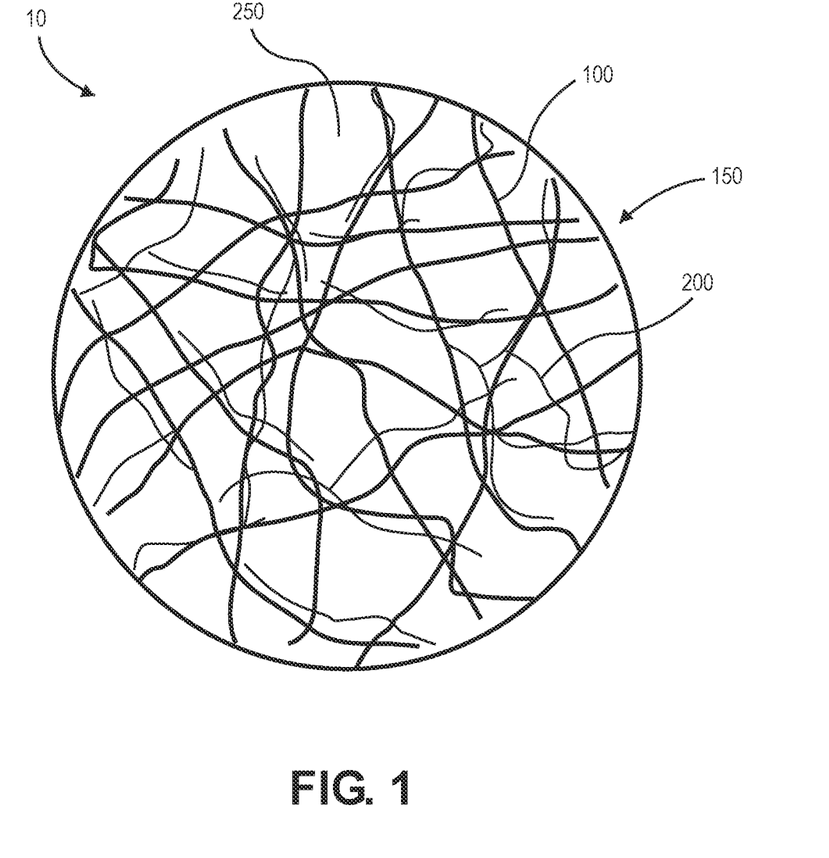
FIG. 1 illustrates a conductive polymer coating composition according to an implementation of the present disclosure.

As illustrated in FIG. 1, a conductive polymer coating composition 10 can include a conductive fibrillated structure 150 and a base polymer 250. The conductive fibrillated structure 150 can include a fibrillated polymer 100 and a conductive polymer 200 grafted on the fibrillated polymer 100. The fibrillated polymer 100 provides a structural backbone on which conductive polymer 200 is grafted. In some implementations, the fibrillated polymer 100 is non-conductive.

In some implementations, the conductive fibrillated structure 150 includes inorganic particles. For example, a combination of conductive polymer 200 and inorganic particles, such as ZnO2, may be grafted on the fibrillated polymer 100 instead of the conductive polymer 200 alone.

The conductive polymer 200 and/or the inorganic particles may be grafted through chemical modification and binding or thought physical attachment, such as electrospinning of fibrillated polymer with conducting polymers, vacuum filtration, layer-by-layer assembly process, physical vapor deposition, and the like.

The conductive polymer coating composition 10 can have an electrical conductivity from about $10^{-5}$ S/cm to about $10^{+1}$ S/cm and a thermal conductivity from about 1.1 W/m K to about 3 W/m K. The conductive polymer coating composition 10 can have an electrical conductivity from about $10^{-5}$ S/cm to about $10^{+2}$ S/cm or from about $10^{-4}$ S/cm to about $10^{+1}$ S/cm. The conductive polymer coating composition 10 can have a thermal conductivity from about 0.5 W/m K to about 8 W/m K or from about 1 W/m K to about 5 W/m K.

As used herein, the term "fibrillation" or "fibrillated" refers to an explosion of a polymer into fibrils or minute fibers upon exposure to heat, shear, and/or other pressure or triggering condition. Not all polymers will fibrillate. A polymer which has not yet been fibrillated but is capable of fibrillation is referred to as a "fibrillatable" polymer.

Accordingly, the conductive fibrillated structure 150 includes a fibrillatable polymer 100 configured to craze under solution and/or shear stress conditions. In other implementations, the conductive fibrillated structure includes a fibrillated polymer 100.

The fibrillated polymer 100 can include one or more of polytetrafluoroethylene (PTFE), a sulfonated tetrafluoroethylene-based fluoropolymer-copolymer, such as Nafion, Nylon, cellulose, high-density polyethylene (HDPE), or combinations thereof.

The conductive polymer coating composition 10 can include from about 0.5 weight % to about 20 weight % fibrillated polymer 100, from about 1 weight % to about 15 weight % fibrillated polymer 100, or from about 5 weight % to about 10 weight % fibrillated polymer 100.

The conductive fibrillated structure 150 includes a conductive polymer 200. For example, the conductive polymer 200 can be grafted to the fibrillated polymer 100.

The conductive polymer 200 can include one or more of polyaniline, polypyrrole, poly(N-methylpyrrole), poly(N-ethylpyrrole), poly(N-propylpyrrole), poly(N-butylpyrrole), poly(3,4-ethylenedioxythiophene), poly (p-phenylene vinylene), 3, 4-propylenedioxypyrrole, poly(p-phenylene vinylene), 3,4-propylenedioxypyrrole, 3,4-propylenedioxythiophene, polyfuran, derivatives and copolymers thereof, or combinations thereof.

The conductive polymer coating composition can include from about 1 weight % to about 25 weight % conductive fibrillated structure 150, from about 1 weight % to about 20 weight % conductive fibrillated structure 150, or from about 5 weight % to about 20 weight % conductive fibrillated structure 150.

In some implementations, the conductive polymer coating composition 10 further includes one or more conductive additives. The one or more conductive additives can be electrically conductive additives and/or thermally conductive additives. The one or more conductive additives can include carbonaceous materials, such as carbon nanotubes, graphene, and graphite, conductive pigments, metal particles, polyaniline, polypyrrole poly(3,4-ethylenedioxythiophene), aluminosilicate, boron nitride, aluminum nitride, nitrides, such as zirconium nitride, tungsten nitride, vanadium nitride, tantalum nitride, and niobium nitride, carbides, polybenzoxazine, inorganic oxides, such as silica or zirconia, or combinations thereof. The nitrides can include zirconium nitride, tungsten nitride, vanadium nitride, tantalum nitride, and niobium nitride.

The conductive polymer coating composition can include from about 0.1 weight % to about 15 weight % conductive materials. For example, the conductive polymer coating composition can include from about 0.1 weight % to about 10 weight % or from about 0.2 weight % to about 8 weight % conductive materials. Conductive materials can include the total amount of conductive polymer 200 and the one or more conductive additives.

For example, the conductive polymer coating composition can include from about 0.1 weight % to about 15 weight % conductive polymer 200, from about 0.1 weight % to about 10 weight % conductive polymer 200, or from about 1 weight % to about 10 weight % conductive polymer 200.

The conductive polymer coating composition can include from about 0.1 weight % to about 10 weight % conductive additives, from about 0.5 weight % to about 10 weight % conductive additives, or from about 1 weight % to about 10 weight % conductive additives.

The conductive polymer coating composition can include from about 0.05 weight % to about 5 weight % carbonaceous materials, from about 0.1 weight % to about 5 weight % carbonaceous materials, or from about 1 weight % to about 5 weight % carbonaceous materials.

The conductive polymer coating composition can include from about 0.01 weight % to about 5.0 weight % metal particles, from about 0.01 weight % to about 3 weight % metal particles, or from about 0.01 weight % to about 1 weight % metal particles.

The metal particles can include gold (Au), silver (Ag), zinc (Zn), and/or nickel (Ni) particles, copper (Cu), ferromagnetic materials, such as Iron-Nickel (Fe—Ni) and Iron-Cobalt (Fe—Co) alloys, or combinations thereof.

In some implementations, the conductive fibrillated structure 150 can further include one or more conductive additives. In other implementations, the conductive polymer 200 can include one or more conductive additives. For example, the conductive polymer 200 can be a composite conductive polymer including one or more conductive additives, such as a polymer composite containing small volume fractions of ferromagnetic material with high magnetic permeability and intrinsically conducting materials like carbon nanotubes.

The conductive fibrillated structure 150 can include up to about 10 weight % conductive additives. For example, the conductive fibrillated structure 150 can include from about 0.01 weight % to about 10 weight % conductive additives, from about 0.5 weight % to about 8 weight % conductive additives, or from about 0.5 weight % to about 3 weight % conductive additives.

The conductive polymer coating composition 10 includes a base polymer 250. The base polymer 250 can include one or more of epoxy, acrylic, polyurethane, polysiloxane, polycarbonate, polysilazane, styrene-butadiene rubbers, styrenic block copolymers (thermoplastic elastomers), acetonitrile butadiene styrene, polyamides, polyetherketone, polyethyleneterephthalate, derivatives thereof, or combinations thereof. In some implementations, the base polymer 250 can include one or more conductive additives.

The conductive polymer coating composition 10 can include from about 20 weight % to about 90 weight % base polymer 250, from about 20 weight % to about 80 weight % base polymer 250, from about 35 weight % to about 75 weight % base polymer 250, or from about 20 weight % to about 65 weight % base polymer 250.

For example, the base polymer 250 can include from about 60 weight % to about 90 weight % acrylic, from about 65 weight % to about 85 weight % acrylic, or from about 70 weight % to about 80 weight % acrylic. The base polymer 250 can include from about 20 weight % to about 60 weight % epoxy, from about 20 weight % to about 50 weight % epoxy, or from about 30 weight % to about 50 weight % epoxy. The base polymer 250 can include from about 40 weight % to about 70 weight % polyurethane, from about 45 weight % to about 65 weight % polyurethane, or from about 50 weight % to about 60 weight % polyurethane.

In some implementations, the conductive polymer coating composition 10 can further include one or more solvents. For example, the base polymer 250 can be dissolved in a solvent. In other implementations, the conductive fibrillated structure 150 can also include a solvent.

The conductive polymer coating composition 10 can include from about 15 weight % to about 40 weight % solvent, from about 5 weight % to about 20 weight % solvent, or from about 10 weight % to about 18 weight % solvent.

The solvent can include one or more of hexane, acetone, N-methyl-2-pyrrolidone, xylene, water, methyl ethyl ketone, dimethylacetamide, cymene, toluene, cyclohexane, alpha-beta-pinene, hexafluroisopropanol, dimethylformamide, dimethylsulfoxide or combinations thereof. In some implementations, the solvent is water, and/or consists essentially of water.

As described above, the conductive polymer coating composition 10 includes a conductive fibrillated structure 150 and a base polymer 250. In some implementations, the conductive fibrillated structure 150 forms a reinforcement phase through the base polymer. As used herein, the term "reinforcement phase" refers to an open structured entangled mass of microfibers that reinforces/facilitates a functional requirement, for example conductivity.

In some implementations, the conductive fibrillated structure 150 provides a continuous conductive network through the base polymer 250 and the conductive polymer coating composition 10. As used herein, the term "continuous conductive network" refers to a structure capable of maintaining conductivity above a percolation threshold through various processing steps, including preparation, deposition, and curing of the conductive polymer coating composition 10. In other implementations, a "continuous conductive network" is less affected or not affected by segregation of conductive elements within the conductive polymer coating composition 10 during preparation, deposition, and curing of the conductive polymer coating composition 10.

In some implementations, the fibrillated polymer 100 is non-reactive. For example, the fibrillated polymer 100 can be non-reactive with respect to at least one of the conductive polymer 200, the one or more conductive additives, and/or the base polymer 250.

The conductive polymer coating composition 10 can further include one or more functional additives. The one or more functional additives can include pigments, fillers, corrosion inhibitive pigments, viscosity agents, rheology agents, grafting agents, adhesion promoters, surfactants, plasticizers, anti-foaming agents, fire retardants, wetting agents or combinations thereof. For example, the functional additives can include one or more of acrylic acid, polyethylene oxide, styrenesulfonic acid, camphorsulphonic acid, N,N-dimethylacrylamide, dodecylbenzenesulfonic acid, sulfonyldiphenol, thymol or combinations thereof.

The base polymer 250 can have a density from about 0.9 g/cm$^3$ to about 2 g/cm$^3$. The conductive fibrillated structure 150 may have a density from about 0.7 to about 1.5 g/cm$^3$.

The conductive polymer coating composition 10 can have a hardness of H or above when tested under Pencil Hardness ASTM D3363.

The conductive polymer coating composition 10 can have a pull-off adhesion from about 12 to about 20 MPa or above when tested under ASTM D4541. In other implementations, the conductive polymer coating composition 10 can have a pull-off adhesion from about 12 to about 18 MPa or from about 12 to about 16 MPa when tested under ASTM D4541.

The conductive polymer coating composition 10 can have a toughness impact resistance as measured under ASTM D2794 of at least 7 Joules or above.

The conductive polymer coating composition 10 can have a corrosion resistance as measured under ASTM B117 of at least 3000 hours salt spray.

In some implementations, the conductive polymer coating composition 10 can be optically clear. For example, the conductive polymer coating composition 10 can have an optical transparency from about 65% to about 95%. In other implementations, the conductive polymer coating composition 10 can have a transparency of about 65% to about 90% or 69% to about 75%. The transparency of the conductive polymer coating composition 10 can be determined using UV-Visible spectroscopy.

Figure 2:
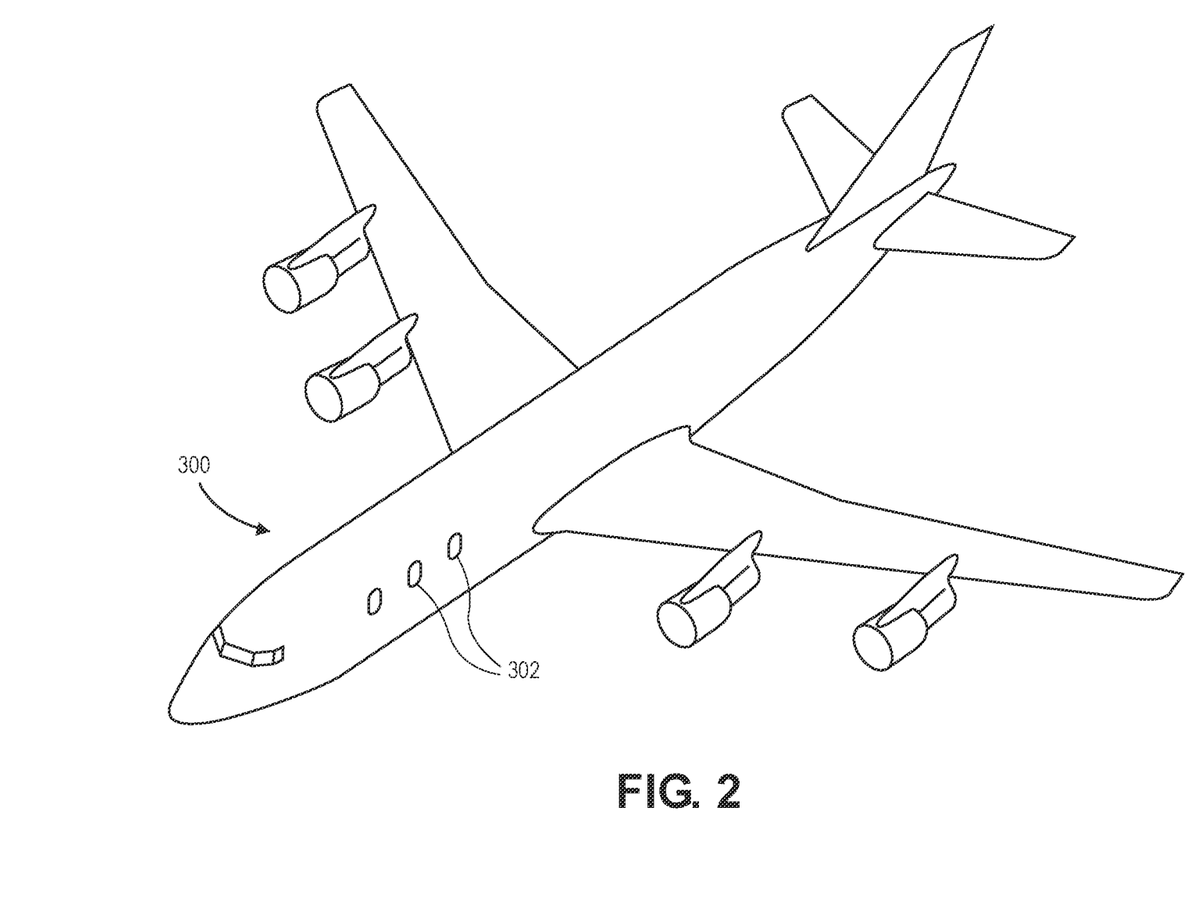
FIG. 2 illustrates a conductive article according to an implementation of the present disclosure.

As illustrated in FIG. 2, the conductive polymer coating composition 10 can be applied to an exterior surface of an aircraft 300, including windows 302, and the conductive polymer coating composition 10 can be optically clear after drying and/or curing. The conductive polymer coating composition 10 can provide an optically clear and continuous conductive network to the aircraft 300 in areas where the conductive polymer coating composition 10 is applied. In other implementations, the conductive polymer coating composition 10 can be applied to display screen of electronic devices and various characterization equipment, such as a scanning electron microscope, and the conductive polymer coating composition 10 will be optically clear after drying and/or curing and provide a continuous conductive network where applied.

Accordingly, a conductive article can include a conductive polymer coating composition 10 as described above, wherein the conductive polymer coating composition 10 provides a continuous conductive network where applied. For example, the conductive article can include an aircraft 300 including the conductive polymer coating composition 10 of the present disclosure. In some implementations, the conductive polymer coating composition 10 can be deposited over windows 302 of an aircraft 300 including the conductive polymer coating composition 10, and the conductive polymer coating composition 10 is optically clear after drying or curing. The conductive polymer coating composition 10 can provide a continuous conductive network to the aircraft, where applied, including over the windows.

Figure 3:
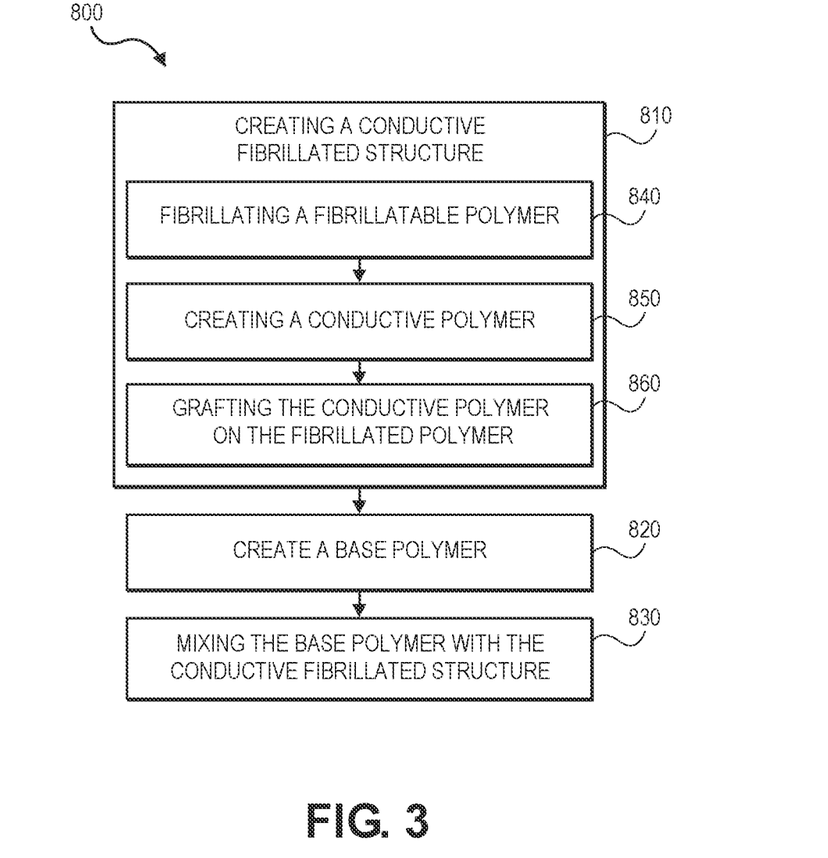
FIG. 3 illustrates a method to make a conductive polymer coating composition according to an implementation of the present disclosure.

FIG. 3 illustrates an example of a method that, for instance, could be used to make a conductive polymer coating composition 10 as described above and as illustrated in FIG. 1. As such, the discussion below will reference various components as illustrated in FIG. 1.

As illustrated in FIG. 3, a method 800 includes creating a conductive fibrillated structure 150 in operation 810, creating a base polymer 250 in operation 820, and mixing the base polymer 250 with the conductive fibrillated structure 150 in operation 830.

Creating a conductive fibrillated structure 150 in operation 810 can include fibrillating a fibrillatable polymer 100 in operation 840, creating a conductive polymer 200 in operation 850, and grafting the conductive polymer 200 on the fibrillated polymer 100 in operation 860.

In some implementations, fibrillating a fibrillatable polymer 100 in operation 840 comprises one or more of solvent crazing the fibrillatable polymer 100, shear deformation the fibrillatable polymer 100, electro-spinning the fibrillatable polymer 100, biaxial stretching the fibrillatable polymer 100, wet, dry and melt spinning the fibrillatable polymer 100, or combinations thereof. The fibrillated polymer 100 can include one or more of polytetrafluoroethylene (PTFE), a sulfonated tetrafluoroethylene-based fluoropolymer-copolymer, such as Nafion, Nylon, cellulose, high-density polyethylene (HDPE), or combinations thereof.

The fibrillatable polymer 100 can be fibrillated in the presence of one or more conductive additives, and the conductive fibrillated structure 150 can include one or more conductive additives. The one or more conductive additives can include carbonaceous materials, conductive pigments, metal particles, polyaniline, polypyrrole poly(3,4-ethylenedioxythiophene), aluminosilicate, boron nitride, aluminum nitride, nitrides, carbides, polybenzoxazine or combinations thereof. The nitrides can include zirconium nitride, tungsten nitride, vanadium nitride, tantalum nitride, and niobium nitride.

The fibrillatable polymer 100 can be fibrillated in the presence of one or more functional additives, and the conductive fibrillated structure 150 can include one or more functional additives. The one or more functional additives can include pigments, fillers, corrosion inhibitive pigments, viscosity agents, rheology agents, grafting agents, adhesion promoters, surfactants, plasticizers, anti-foaming agents, fire retardants, or combinations thereof. For example, the one or more functional additives can include fillers, such as titanium dioxide ($TiO_2$), mica, silica, or aluminum stearate. Pigments or fillers can be added to the conductive fibrillated structure 150 to improve an opacity and/or a glassiness or transparency of the conductive polymer coating composition 10.

In some implementations, fibrillating a fibrillatable polymer 100 in operation 840 causes the fibrillatable polymer 100 to form a fibrillated mass in which the one or more conductive additives and/or the one or more functional additives are embedded or enmeshed.

Creating a conductive polymer 200 in operation 850 can include dissolving a monomer in a solvent, such as an acid. The monomer may correspond to the individual unit of conductive polymer 200 used, and the solvent may correspond to the type of monomer and dopant. For example, the monomer may correspond to one or more of polyaniline, polypyrrole, poly(N-methylpyrrole), poly(N-ethyllpyrrole), poly(N-propylpyrrole), poly(N-butylpyrrole), poly(3,4-ethylenedioxythiophene), poly (p-phenylene vinylene), 3,4-propylenedioxypyrrole, poly(p-phenylene vinylene), 3,4-propylenedioxypyrrole, 3,4-propylenedioxythiophene, polyfuran, derivatives and copolymers thereof, or combinations thereof.

The solvent can include water for water soluble monomers/polymers. The solvent can include acids, such as hydrochloric acid, oxalaic acid, benzoic acid, and the like. In other examples, the solvent may be acetone or n-methyl-2-pyrrolidone (NMP), or hexane according to the conductive polymer 200 used. In yet other examples, the solvent can include one or more of hexane, acetone, N-methyl-2-pyrrolidone, xylene, water, methyl ethyl ketone, dimethylacetamide, cymene, toluene, cyclohexane, alpha-beta-pinene, hexafluroisopropanol, dimethylformamide, dimethylsulfoxide or combinations thereof.

The conductive polymer 200 of operation 850 can further include an oxidant, such as ferric chloride, ammonium persulphate, etc., to initiate the polymerization of the monomer units.

The conductive polymer 200 of operation 850 can further include a dopant, such as benzoate, oxalate, or chloride, as acid to disperse the monomer before the polymerization.

The conductive polymer 200 of operation 850 can further include one or more conductive additives. The one or more conductive additives can include carbonaceous materials, conductive pigments, metal particles, polyaniline, polypyrrole poly(3,4-ethylenedioxythiophene), aluminosilicate, boron nitride, aluminum nitride, nitrides, carbides, polybenzoxazine or combinations thereof. The nitrides can include zirconium nitride, tungsten nitride, vanadium nitride, tantalum nitride, and niobium nitride. For example, the conductive polymer 200 of operation 850 can be a composite conductive polymer 200 including one or more conductive additives, such as a polymer composite containing small volume fractions of ferromagnetic material with high magnetic permeability and intrinsically conducting materials like carbon nanotubes or graphene.

In other implementations, polymerization of the conductive polymer 200 with inorganic particles can be used to create a composite conductive polymer 200. For example, polymerization of aniline in presence of ZnO2 nanoparticles can produce polyaniline-ZnO2 composites. However, different monomer other than aniline can also be used with other inorganic particles.

Grafting the conductive polymer 200 on the fibrillated polymer 100 in operation 860 can include one or more of in-situ polymerization of the conductive polymer 200 to the fibrillated polymer 100, fibril surface functionalization of the fibrillated polymer 100 with the conductive polymer 200, fibril-surface modification of the fibrillated polymer 100 with the conductive polymer 200, or combinations thereof.

For example, in-situ polymerization of the conductive polymer 200 to the fibrillated polymer 100 can include reacting the monomers of the conductive polymer 200 with the fibrillated polymer 100. The acid-anionic part can be a dopant on the conductive polymer 200. In some examples, depending on the monomer used, adhesion promoters can be used to improve an adhesion between the conductive polymer 200 and the fibrillated polymer 100.

Fibril surface functionalization of the fibrillated polymer 100 with the conductive polymer 200 can include reacting the fibrillatable polymer 100 with conductive polymer 200 in the presence of functionalizing or grafting agents, such as acrylic acid, polyethylene oxide (PEO), styrenesulfonic acid (NaSS), and N,N-Dimethylacrylamide (DMAA). Fibril surface functionalization can include a silane treatment as a middle step to improve an adhesion between the conductive polymer 200 and the fibrillated polymer 100.

Fibril-surface modification of the fibrillated polymer 100 with the conductive polymer 200 can include reacting the functionalized fibrillated polymer 100 with monomers of the conductive polymer 200, together with an oxidant, such as ferric chloride or ammonium persulphate, and a dopant as acid to disperse the monomer. The acid can include hydrochloric acid, benzoic acid, and/or oxalic acid.

In some implementations, fibrillating a fibrillatable polymer 100 in operation 840 causes the fibrillatable polymer 100 to form a fibrillated mass in which the conductive polymer 200 is embedded or enmeshed.

Creating a base polymer 250 in operation 820 can include dissolving a base polymer 250 in a solvent. The base polymer 250 can include one or more of epoxy, acrylic, polyurethane, polysiloxane, polycarbonate, polysilazane, styrene-butadiene rubbers, styrenic block copolymers (thermoplastic elastomers), acetonitrile butadiene styrene, polyamides, polyetherketone, polyethyleneterephthalate, derivatives thereof, or combinations thereof.

The solvent can include one or more of hexane, acetone, N-methyl-2-pyrrolidone, xylene, water, methyl ethyl ketone, dimethylacetamide, cymene, toluene, cyclohexane, alpha-beta-pinene, hexafluroisopropanol, dimethylformamide, dimethylsulfoxide or combinations thereof. In some implementations, the solvent is chosen according to the base polymer 250 selected.

The base polymer 250 of operation 820 can further include one or more conductive additives. The one or more conductive additives can include carbonaceous materials, conductive pigments, metal particles, polyaniline, polypyrrole poly(3,4-ethylenedioxythiophene), aluminosilicate, boron nitride, aluminum nitride, nitrides, carbides, polybenzoxazine or combinations thereof. The nitrides can include zirconium nitride, tungsten nitride, vanadium nitride, tantalum nitride, and niobium nitride.

The base polymer 250 of operation 820 can further include one or more functional additives. The one or more functional additives can include pigments, fillers, corrosion inhibitive pigments, viscosity agents, rheology agents, grafting agents, adhesion promoters, surfactants, plasticizers, anti-foaming agents, fire retardants, activators, or combinations thereof. For example, the base polymer 250 can include an activator to catalyze a curing reaction at specific conditions, if needed. The one or more functional additives can include block copolymers as compatibilizers. Pigments or fillers can be added to the base polymer 250 to improve an opacity and/or a glassiness or transparency of the conductive polymer coating composition 10.

Mixing the base polymer 250 with the conductive fibrillated structure 150 in operation 830 can include mixing from about 1 weight % to about 15 weight % of the conductive fibrillated structure 150 with from about 20 weight % to about 90 weight % base polymer 250 to create a stabilized suspension, based on a total weigh of the conductive polymer coating composition 10.

Mixing the base polymer 250 with the conductive fibrillated structure 150 can further include mixing in one or more functional additives. The one or more functional additives can include pigments, fillers, corrosion inhibitive pigments, viscosity agents, rheology agents, grafting agents, adhesion promoters, surfactants, plasticizers, anti-foaming agents, fire retardants, or combinations thereof. For example, levelling agents and surfactants, may be added as required to create a stable suspension.

Figure 4:
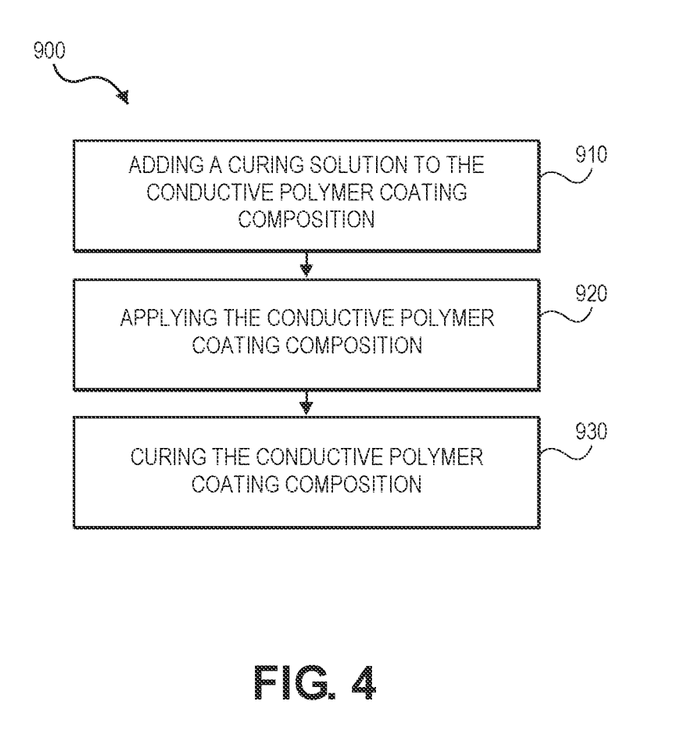
FIG. 4 illustrates a method to apply a conductive polymer coating composition according to an implementation of the present disclosure.

FIG. 4 illustrates an example of a method that, for instance, could be used to apply a conductive polymer coating composition 10 as described above and as illustrated in FIG. 1. As such, the discussion below will reference various components as illustrated in FIG. 1.

As illustrated in FIG. 4, a method 900 may include adding a curing solution to the conductive polymer coating composition 10 in operation 910; applying the conductive polymer coating composition 10 in operation 920; and curing the conductive polymer coating composition 10 in operation 930.

Adding a curing solution to the conductive polymer coating composition 10 in operation 910 can include adding a curing solution or hardener to initiate cross-linking in the conductive polymer coating composition 10. The curing solution can be based on the curing requirements for an article to be coated. In other implementations, the conductive polymer coating composition 10 can be cured by heat, moisture, and/or solvent evaporation.

Applying the conductive polymer coating composition 10 in operation 920 can include brushing, spraying, or dipping the conductive polymer coating composition 10 to an article.

For example, the conductive polymer coating composition 10 can be applied by high pressure air assist airless electrostatic spraying, high volume low pressure (HVLP) spraying, and/or air electrostatic spraying. In other implementations, the conductive polymer coating composition 10 can be applied via inkjet printing, aerosol jet, direct write, and filament processes for 3D printing conductive structures.

Curing the conductive polymer coating composition 10 in operation 930 can include curing by air, UV, or by heating.

Figure 5:
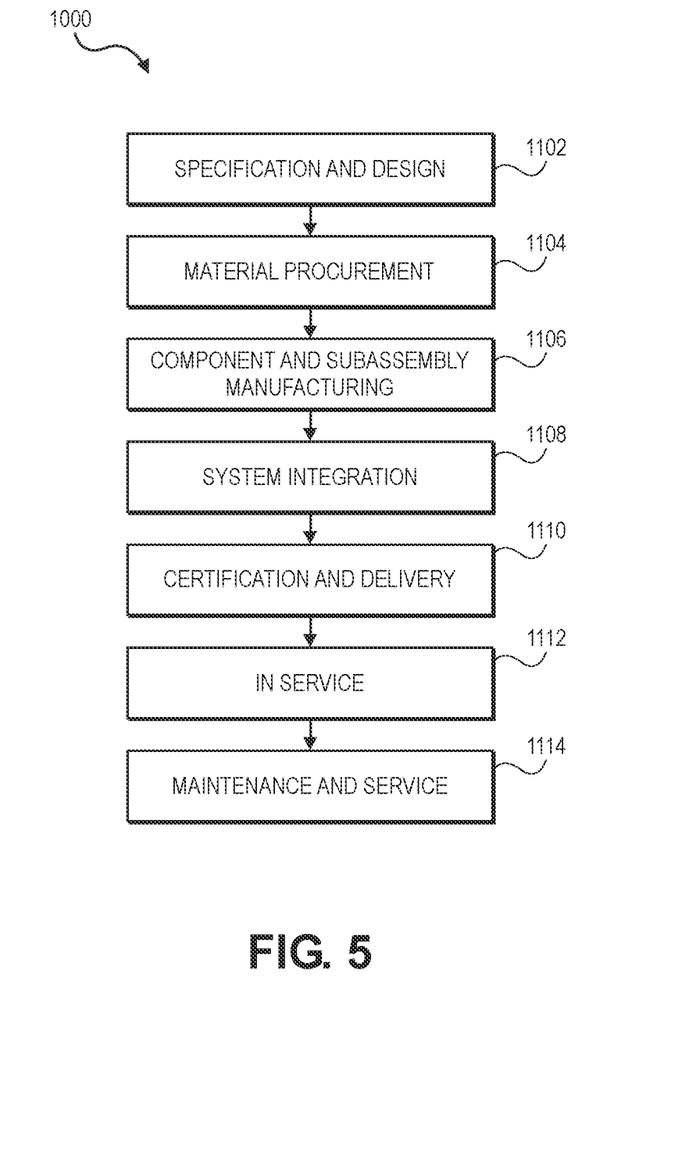
FIG. 5 illustrates a flow diagram of aircraft production and service methodology.
Figure 6:
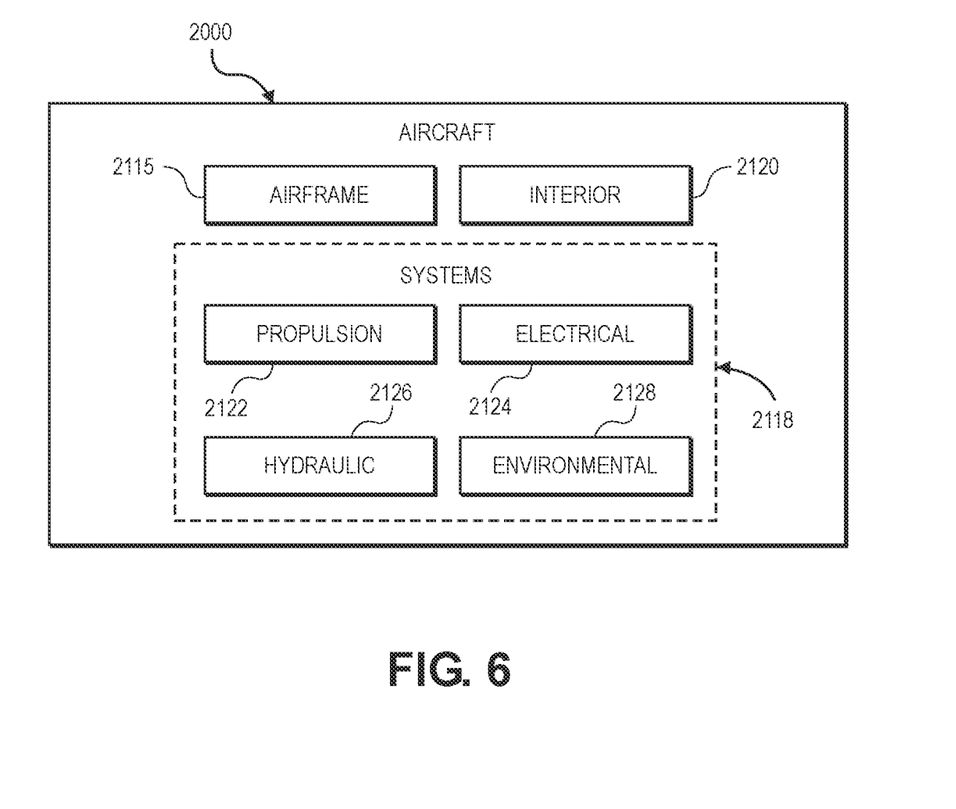
FIG. 6 illustrates a block diagram of an aircraft.

Implementations of the present disclosure may find use in a variety of potential applications, particularly in the transportation industry, including for example, aerospace, marine, automotive applications, and other application where conductive polymer coating compositions are desired. Thus, referring now to FIGS. 5 and 6, implementations of the disclosure may be used in the context of an aircraft manufacturing and service method 1000 as shown in FIG. 5 and an aircraft 2000 as shown in FIG. 6. During preproduction, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods exemplified herein may be employed during any one or more of the stages of the aircraft manufacturing and service method 1000. For example, components or subassemblies corresponding to production process 1106 may be fabricated or manufactured in a manner similar to components or subassemblies produced while the aircraft 2000 is in service. Also, one or more apparatus examples, method examples, or a combination thereof may be utilized during the production stages 1106 and the 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 5 and 6 describe the disclosure with respect to aircraft and aircraft manufacturing and servicing, the present disclosure is not limited thereto. The conductive polymer coating compositions and methods of the present disclosure may also be used for spacecraft, satellites, submarines, surface ships, automobiles, tanks, trucks, power plants, and any other suitable type of objects.

EXAMPLES

Aspects of the present disclosure may be further understood by referring to the following examples. The examples are illustrative and are not intended to be limiting embodiments thereof. Table 1 illustrates a conductive polymer coating composition 10 according to implementations of the present disclosure.

TABLE 1

| Ingredient | Weight Percent |
| --- | --- |
| Base Polymer 250 | 20 to 90 |
| Conductive Fibrillated Structure 150 | 1 to 25 |
| Fibrillated Polymer 100 | 0.5 to 20 |
| Conductive Polymer 200 | 0.1 to 15 |
| Solvent | 15 to 40 |
| Total Conductive Materials | 0.1 to 15 |
| Conductive Additives | 0.1 to 10 |

The present disclosure has been described with reference to exemplary implementations. Although a few implementations have been shown and described, it will be appreciated by those skilled in the art that changes may be made in these implementations without departing from the principles and spirit of preceding detailed description. It is intended that the present disclosure be construed as including all such modifications and alterations insofar as they come within the scope of the appended claims or the equivalents thereof.

What is claimed is:

1. A conductive polymer coating composition comprising:
a conductive fibrillated structure; and
a base polymer,
wherein the conductive fibrillated structure comprises a fibrillated polymer and a conductive polymer grafted on the fibrillated polymer, and
wherein the conductive polymer coating composition has an electrical conductivity from about $10^{-5}$ S/cm to about $10^{+1}$ S/cm and a thermal conductivity from about 1.1 W/m K to about 3 W/m K.

2. The composition of claim 1, comprising:
from about 1 weight % to about 25 weight % conductive fibrillated structure;
from about 20 weight % to about 90 weight % base polymer;
from about 0.5 weight % to about 20 weight % fibrillated polymer; and
from about 0.1 weight % to about 15 weight % conductive polymer,
wherein the base polymer comprises one or more of epoxy, acrylic, polyurethane, polysiloxane, polycarbonate, polysilazane, styrene-butadiene rubbers, styrenic block copolymers, acetonitrile butadiene styrene, polyamides, polyetherketone, polyethyleneterephthalate, derivatives thereof, or combinations thereof.

3. The composition of claim 1, wherein the fibrillated polymer comprises one or more of polytetrafluoroethylene (PTFE), a sulfonated tetrafluoroethylene-based fluoropolymer-copolymer, Nylon, cellulose, high-density polyethylene (HDPE), or combinations thereof.

4. The composition of claim 1, wherein the conductive polymer comprises one or more of polyaniline, polypyrrole, poly(N-methylpyrrole), poly(N-ethyllpyrrole), poly (N-propylpyrrole), poly(N-butylpyrrole), poly(3,4-ethylenedioxythiophene), poly (p-phenylene vinylene), 3, 4-propylenedioxypyrrole, poly(p-phenylene vinylene), 3,4-propylenedioxypyrrole, 3,4-propylenedioxythiophene, polyfuran, derivatives and copolymers thereof, or combinations thereof.

5. The composition of claim 1, wherein the conductive polymer coating composition further comprises from about 0.1 weight % to about 10 weight % of one or more conductive additives, and
    wherein the one or more conductive additives comprise carbonaceous materials, conductive pigments, metal particles, polyaniline, polypyrrole poly(3,4-ethylenedioxythiophene), aluminosilicate, boron nitride, aluminum nitride, nitrides, carbides, polybenzoxazine or combinations thereof.

6. The composition of claim 5, wherein the conductive polymer is a composite conductive polymer comprising one or more conductive additives.

7. The composition of claim 6, wherein the conductive fibrillated structure further comprises from about 0.1 weight % to about 10 weight % of the one or more conductive additives.

8. The composition of claim 1, further comprising from about 15 weight % to about 40 weight % solvent, and
    wherein the solvent comprises one or more of hexane, acetone, N-methyl-2-pyrrolidone, xylene, water, methyl ethyl ketone, dimethylacetamide, cymene, toluene, cyclohexane, alpha-beta-pinene, hexafluroi sopropanol, dimethylformamide, dimethylsulfoxide or combinations thereof.

9. The composition of claim 8, wherein the solvent consists essentially of water.

10. The composition of claim 1, wherein the conductive fibrillated structure forms a reinforcement phase through the base polymer.

11. The composition of claim 1, wherein the conductive polymer coating composition has a hardness of H or above when tested under Pencil Hardness ASTM D3363.

12. The composition of claim 1, wherein the conductive polymer coating composition has a pull-off adhesion from about 12 to about 20 MPa when tested under ASTM D4541.

13. The composition of claim 1, wherein the conductive polymer coating composition has a toughness impact resistance of at least 7 Joules when tested under ASTM D2794.

14. The composition of claim 1, wherein the conductive polymer coating composition has a corrosion resistance of at least 3000 hours salt spray when tested under ASTM B117.

15. A conductive article, comprising a conductive polymer coating composition according to claim 1, wherein the conductive polymer coating composition provides a continuous conductive network where applied.

16. The conductive article of claim 15, wherein the conductive polymer coating composition has an optical transparency from about 65% to about 95%.

17. A method of making a conductive polymer coating composition, comprising:
    creating a conductive fibrillated structure;
    creating a base polymer composition; and
    mixing the base polymer with the conductive fibrillated structure.

18. The method of claim 17, wherein creating a conductive fibrillated structure comprises:
    fibrillating a fibrillatable polymer;
    creating a conductive polymer; and
    grafting the conductive polymer on the fibrillated polymer.

19. The method of claim 17, wherein fibrillating a fibrillatable polymer comprises one or more of solvent crazing the fibrillatable polymer, shear deformation the fibrillatable polymer, electro-spinning the fibrillatable polymer, biaxial stretching the fibrillatable polymer, wet, dry and melt spinning the fibrillatable polymer, or combinations thereof.

20. The method of claim 17, wherein grafting the conductive polymer on the fibrillated polymer comprises one or more of in-situ polymerization of the conductive polymer to the fibrillated polymer, fibril surface functionalization of the fibrillated polymer with the conductive polymer, fibril-surface modification of the fibrillated polymer with the conductive polymer, or combinations thereof.

\* \* \* \* \*